Patented Mar. 31, 1931

1,798,996

UNITED STATES PATENT OFFICE

CLEMENTS BATCHELLER, OF BROOKLYN, NEW YORK, ASSIGNOR, BY MESNE ASSIGN-
MENTS, TO BEMIS INDUSTRIES, INC., OF BOSTON, MASSACHUSETTS, A CORPORATION
OF DELAWARE

PROCESS FOR SURFACE-COLORING BODIES

No Drawing. Application filed February 23, 1926. Serial No. 90,156.

My invention relates to the surface coloring of objects having an alkaline reaction and more particularly to the surface coloring of cementitious tiles, shingles, slabs, and the like.

One object of my invention is to provide an improved method of obtaining permanent and especially attractive coloring effects on objects having alkaline reaction. A further object is to provide a new and useful process of obtaining particularly desirable blended colored surfaces upon cementitious tiles, shingles, slabs and the like. Another object is to render bodies having a cementitious base free from the objectionable lime bloom and at the same time surface coating them with an attractive, colored coating. Further objects will be apparent from consideration of the specification and the claims.

The present invention is characterized by the application to a more or less dense body (e. g. a commercial asbestos cement shingle), having an alkaline reaction, of one or more metallic salt solutions which in the presence of the alkali form insoluble compounds and the subsequent control of the evaporation of the solutions whereby the color effects are rendered permanent and of a desirable shade and whereby the colors are perfectly blended into each other. It has been found that if the metallic salts are added and no further treatment is employed that the precipitated insoluble compound will not have penetrated the object to a sufficient depth and will therefore tend to dust off. The colors, furthermore, will not be bright or clear and if the attempt is made to color the object by the use of more than one inorganic compound, streaks will result and it is impossible to obtain perfect blending between the compounds. I have found that if the solution of the metallic salts remains upon the object for a considerable length of time, that the salts will have penetrated to a sufficient depth to give bright and clear colors, and further that no streaking effect will be found if more than one compound is used since the colors will be blended perfectly into each other.

The alkaline material may be added to a porous body for the express purpose of reacting with the metallic salts or the alkaline material may be one of the constituents of the object itself. In either case, a double decomposition takes place with the formation of an insoluble compound of the metal and a salt of the alkali. The alkali material may be a hydroxide of the alkali or alkaline earth metals or one of the soluble carbonates.

Materials made from hydraulic cement, lime, concrete and the like, usually contain sufficient free lime (calcium hydroxide) to be used without the addition of further alkaline material. A composition of this character is commonly used in the manufacture of so-called asbestos shingles—more properly called asbestos cement shingles—a product to which my invention may be applied to advantage. Since the lime is one of the components of the reaction and is transformed into a salt, the possibility of blooming is precluded. The lime salt resulting from the reaction is either soluble, such as the chloride or nitrate and is washed away, or is insoluble, such as the sulphate and remains in the shingle.

The insoluble compounds which color the shingles and prevent the blooming of the lime are of a large variety of colors. Various shades and multi-colored effects may be obtained by choosing the color of the insoluble compound and by blending two or more of these compounds.

As a general rule, the salts of those metals known as the "heavy metals" form insoluble compounds in the presence of alkaline substances. This is always true of the soluble salts of copper, silver, cadmium, mercury, chromium, manganese, and iron regardless of the nature of the alkaline substance and therefore with these metals, the alkaline substance may be caustic soda, caustic potash, ammonia or lime in any percentage. In the case of the amphoteric metals, for example zinc, aluminum and lead, the insoluble compound is formed as in the case of the other compounds except when caustic potash or soda is present in a large excess. With nickel and cobalt, the presence of an excess of ammonia results in the formation of a soluble complex ion salt. In using the amphoteric salts and those capable of forming complex ions, it is necessary that the salt be present in excess of the caustic soda, caustic potash or ammonia, as the case may be. If this excess if maintained or if lime is the alkaline substance present, then all the above metals are applicable for use according to the present invention. Hereafter in the specifications or claims where phrasing similar to "a solution of metallic salt which will react with the alkaline substance to form an insoluble compound" is found, it presupposes the nature and concentration of the alkaline substance to be such that an insoluble compound is formed.

Any soluble salt of the metal is applicable for my invention, and the salt may be the chloride (except with a silver or mercurous ion), the sulphate, the nitrate, the acetate, etc. It is preferable, however, that the salt be free from acid for otherwise the reaction will be one of neutralization until the acid is destroyed, thereby consuming much of the available lime before the formation of an insoluble compound.

The concentrations which are applicable vary from saturation to a relatively dilute solution of 15% or even less. If a single color is desired, the object is completely covered with the solution of the salt in excess of the amount that will be absorbed by the surface pores and allowed to stand for a few minutes. It is then treated according to my invention to allow the solution to be in contact with the body for a considerable time. While this may be effected by continued immersion in the solution, I prefer as a more practical method, that hereinafter set forth. As a practical means of carrying this into effect, I have found that if two flat surfaces are to be treated, both are covered with the solution of the salt and then are placed face to face under a weight sufficient to keep them in close contact and prevent the evaporation of the solution. This insures penetration which is otherwise impossible, and the lack of free access to the oxygen of the air may also be a factor in the color effects produced. A salt which is added in a lower state of oxidation but which is oxidized by the air may give a different color when treated in this manner than when simply exposed to the air until dry.

In order to prevent sharply outlined deposits, I have found it desirable to apply water or weak solution to the treated surface after the solution initially applied has reacted to a substantial extent. The application of water or weak solution modifies and softens the outline of the deposit and blends the latter into the differently colored adjacent surface.

In the event that more than one salt is to be used and blended effects are to be obtained, a portion of the surface is covered with one salt and the solution allowed to absorb for a few minutes, the remaining portions of the surface are then covered with the second metallic salt or the whole surface is flushed with the solution of the second salt and then subjected according to my invention to the slow evaporation of the solution, preferably again, if possible, by placing the surfaces face to face, and subjecting them to pressure until the desired effects are obtained. I have found that this method with the use of two or more salts gives a very desirable blending effect which has heretofore been unknown and which will not result without the use of my process. The length of time of treatment varies with the particular salts used and the particular color effect desired. I have found, for example, that a treatment by this method for twenty-four hours or even less is satisfactory under certain conditions, while at times, I have treated the shingles for ten days with good results. In general, the longer the time of treatment, the more pronounced are the color effects.

Corresponding results may be obtained by other means than the simple placing of the shingles face to face. The object may be placed in a mold made of a suitable material such as wood and the solution in this manner kept for a long time in contact with the object. The object may be placed in a chamber containing saturated air or other gas, thereby preventing the evaporation of any of the solution from the surface of the object, and, depending upon the nature of the gas, effecting a variation in the final effect.

This process of my invention may also be used advantageously with a cementitious body which has been coated with a coloring matter prior to the setting or drying of the cement as described in my application Serial No. 90,157 filed herewith. In this case, many multi-colored effects are possible since the coloring matter may be chosen as well as the colors of the insoluble precipitated compounds. For instance, if the body has an initial coating of green chrome oxide, desirable brown and green effects are obtained by treating portions of the surface with a saturated solution of ferrous sulphate followed by flushing the surface with water and then treating as above for twenty-four hours or more.

As hereinbefore pointed out, various salts may be used since various colored effects are usually desired. I have found that the salts of chromium, copper, iron, nickel and cobalt lend themselves especially to this treatment. The salts of chromium, copper and nickel, due to the formation of their respective hydroxides, give various shades of green and greenish blue. Cobalt salts, due to the formation of the basic cobalt salt, give a deep rich blue, while the iron salts give deep rusty browns, the color of ferric hydroxide. The iron salts may be either ferrous or ferric and the same result is ultimately obtained although the shades may from time to time vary.

I have obtained an attractive blue and gray blended shingle by treating portions of a gray asbestos hydraulic cement shingle with a saturated solution of copper potassium chloride, followed by applying ferrous sulphate to the untreated portions. Two shingles are then placed in contact with the solutions face to face under a heavy weight and allowed to remain unmolested for two days or more, after which time the shingles are washed and dried. The longer that they remain in contact with the solution, the more pronounced will be the color effect.

A deep brown shingle is obtained if the whole surface is treated with a solution of saturated copper potassium chloride, followed by treatment with saturated ferrous sulphate. As in the previous example, two shingles are placed face to face in contact with the solution under a heavy weight from two to ten days, depending upon the exact shade desired.

Obviously other means may be employed to keep the solution in contact with the object for a considerable time and the invention is not to be limited to any particular means of accomplishing this. Nor is there any limitation in the proportions of the salts used, nor in the length of the period of treatment, nor in the particular color effects obtained, since all of these may be widely varied.

I claim:

1. The process of surface coloring flat objects having an alkaline reaction which comprises treating the objects with a solution of a metallic salt which will react with the alkaline substance to form an insoluble compound, and juxtaposing the treated surfaces to retard evaporation of the solution.

2. The process of surface coloring flat objects having an alkaline reaction which comprises treating the objects with a solution of a metallic salt which will react with the alkaline substance to form an insoluble compound, and juxtaposing the treated surfaces under pressure to retard evaporation of the solution.

3. The process of surface coloring asbestos hydraulic cement shingles which comprises treating the shingles with a solution of a metallic salt which will react with the alkaline substance to form an insoluble compound, and juxtaposing the treated surfaces under pressure to retard evaporation of the solution.

4. The process of surface coloring flat objects having an alkaline reaction which comprises treating the objects with a plurality of solutions of metallic salts which will react with the alkaline substance to form insoluble compounds, and juxtaposing the treated surfaces to retard evaporation of the solutions.

5. The process of surface coloring cementitious objects which comprises treating the objects with a plurality of solutions of metallic salts which will react with an alkaline compound of the object to form insoluble compounds, and juxtaposing treated surfaces under pressure to retard evaporation of the solutions.

6. The process of surface coloring asbestos hydraulic cement shingles which comprises treating the shingles with a plurality of solutions of metallic salts which will react with an alkaline compound of the shingle to form insoluble compounds, and juxtaposing treated surfaces under pressure to retard evaporation of the solutions.

7. The process of surface coloring flat objects having an alkaline reaction which comprises treating a portion of the surface with a metallic salt which reacts to form an insoluble compound of the alkaline substance, treating another portion with a second metallic salt which forms an insoluble compound with the alkali, and juxtaposing treated surfaces to retard evaporation of the solutions.

8. The process of surface coloring flat objects having an alkaline reaction which comprises treating a portion of the surface with a metallic salt which reacts to form an insoluble compound of the alkaline substance, treating another portion with a second metallic salt which forms an insoluble compound with the alkali, and juxtaposing treated surfaces under pressure to retard evaporation of the solutions.

9. The process of surface coloring flat asbestos hydraulic cement shingles which comprises treating a portion of the surface with a metallic salt which reacts to form an insoluble compound of the alkaline substance, treating another portion with a second metallic salt which forms an insoluble compound with the alkali, and juxtaposing treated surfaces under pressure to retard evaporation of the solutions.

10. The process of obtaining a blended colored asbestos hydraulic cement shingle which comprises treating at least portions of the surface with a solution of a copper salt followed by a treatment with a solution of an iron salt, and maintaining said shingle face to face with another shingle similarly treated and while solution is still present, until the desired shade is obtained.

11. The process of obtaining a blended colored asbestos hydraulic cement shingle which comprises treating the surface with a solution of a copper salt followed by a treatment with a solution of an iron salt, and maintaining said shingle face to face under weight with another shingle similarly treated and while solution is still present until the desired shade is obtained.

CLEMENTS BATCHELLER.